US008520815B2

(12) United States Patent
Sun (10) Patent No.: US 8,520,815 B2
(45) Date of Patent: Aug. 27, 2013

(54) FACSIMILE MACHINE AND FACSIMILE FORWARD METHOD

(75) Inventor: Duen-Wu Sun, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/327,874

(22) Filed: Dec. 16, 2011

(65) Prior Publication Data

US 2012/0257734 A1      Oct. 11, 2012

(30) Foreign Application Priority Data

Apr. 7, 2011    (TW) .............................. 100112106 A (51) Int. Cl.
*H04M 11/00*     (2006.01)

(52) U.S. Cl.
USPC ............ 379/100.09; 379/100.08; 379/100.12; 379/100.13

(58) Field of Classification Search
USPC ............ 379/100.09, 100.08, 100.12, 100.13, 379/100.01; 358/1.15, 407, 402
See application file for complete search history.

(56) References Cited

U.S. PATENT DOCUMENTS

| | | | |
|---|---|---|---|
| 6,020,980 A * | 2/2000 | Freeman ................. | 379/100.08 |
| 6,693,729 B1 * | 2/2004 | Bloomfield ............. | 379/100.09 |
| 7,116,433 B1 * | 10/2006 | Toyoda .................... | 379/100.09 |
| 7,656,549 B2 * | 2/2010 | Izumisawa ............... | 379/100.09 |
| 7,940,411 B2 * | 5/2011 | Henry et al. ............. | 379/100.08 |
| 8,199,349 B2 * | 6/2012 | Narahara ................. | 379/100.01 |
| 2005/0275871 A1 * | 12/2005 | Baird et al. ............. | 379/100.09 |
| 2005/0275873 A1 * | 12/2005 | Sekiguchi ............... | 379/100.09 |

* cited by examiner

*Primary Examiner* — Stella Woo
(74) *Attorney, Agent, or Firm* — Altis Law Group, Inc.

(57) ABSTRACT

A facsimile machine and a method for forwarding facsimile data are disclosed. The facsimile forward method, the facsimile forward method comprises receiving facsimile data from a facsimile sending machine over a telephone network; extracting identification information from the facsimile data; determining whether the identification information matches a plurality of predetermined identification information; and forwarding the facsimile data to a destination E-mail address over a communication network other than the telephone network, when the identification information matches any of the plurality of predetermined identification information.

3 Claims, 10 Drawing Sheets

FACSIMILE MACHINE AND FACSIMILE FORWARD METHOD

BACKGROUND

1. Technical Field

The disclosure generally relates to a facsimile machine and a method for forwarding facsimile data.

2. Description of Related Art

Multi-function peripherals (MFPs) including scanner units, printer units and facsimile units are popularly used because the MFPs are relatively small in size, low noise and may perform color copying, printing, scanning, and facsimile transmission at low cost. The MFPs are capable of receiving facsimile data transmitted from facsimile sending machines over a PSTN (public switched telephone network), and printing the received facsimile data on sheets of paper. In many cases, users do not want the facsimile data as a printed paper file; but as an electronic file. The users may have to use the MFPs to scan the printed paper file to retrieve the facsimile data to the electronic file. Therefore, there is a need for a technique for forwarding the facsimile data in the form of electronic documents to a terminal.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media comprise CDs, DVDs, BLU-RAY, flash memory, and hard disk drives.

Figure 1:
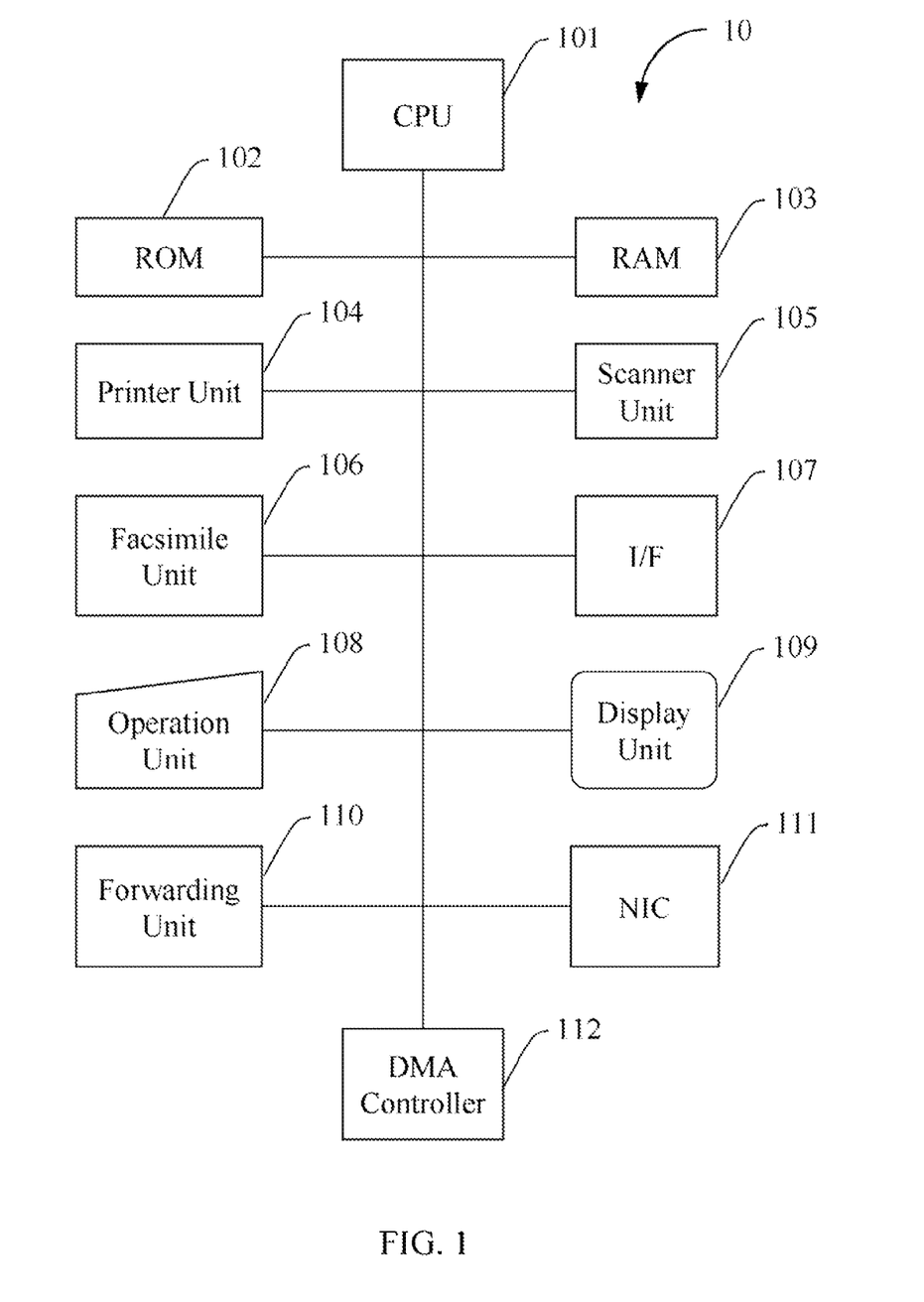
FIG. 1 is a functional block diagram of a multi-function peripheral (MFP) which is an example of a facsimile receiving machine according to one embodiment.

FIG. 1 is a functional block diagram of a multi-function peripheral (MFP) 10 which is an example of an image processing apparatus according to one embodiment. The MFP 10 comprises a central processing unit (CPU) 101, a read only memory (ROM) 102, a random access memory (RAM) 103, a printer unit 104, a scanner unit 105, a facsimile unit 106, an interface (I/F) 107, an operation unit 108, a display unit 109, a forwarding unit 110, a network interface controller (NIC) 111, and a direct memory access (DMA) controller 112.

The CPU 101 is a processor for controlling the MFP 10 overall. The MFP 10 is controlled by running one or more programs (firmware) stored in the ROM 102.

The ROM 102 is non-volatile memory for storing the program for controlling the MFP 10.

The RAM 103 is volatile memory which is used as a working area when the CPU 101 runs the program stored in the ROM 102.

The printer unit 104 may print image data or facsimile data on a sheet of paper, an overhead projector (OHP) sheet, or the like (hereinafter, these will be referred to generically as a "printing medium"). In one embodiment, the printer unit 104 is an inkjet printer which comprises a printhead, a motor, and an ink cartridge. The printer unit 104 causes the ink carriage in the printhead to scan on the printing medium in a reciprocating manner, and to apply ink to the printing medium. Printing is performed by transporting the printing medium according to the scanning perpendicularly to the scanning direction of the carriage.

The scanner unit 105 may scan an image on a sheet of paper, a plastic sheet, a film, or any flat surface, and generate image data. The scanner unit 105 temporarily buffers, in the RAM 103, image data that has been generated by scanned images.

The scanner unit 105 may comprise a scanner head which has a scanning width corresponding to an overall width of a largest readable medium (for example, A4-size paper). In the scanner head, a plurality of charge-coupled devices (CCDs) or a plurality of CMOS image sensors (CISs) may be arranged in the scanner head, in a line along the scanning width direction. Image data is obtained by the plurality of CCDs detecting light from the image, and converting the detected light into electrical signals. Further, the scanner head may be mechanically moved along a linear direction in a stepwise fashion by a motor of the scanner unit 105, with the linear direction being perpendicular to the line of the plurality of CCDs. An entire image is scanned by a combination of an electrical scanning of the plurality of CCDs and a mechanical movement of the scanner head. In the present disclosure, a direction of the electrical scanning performed by the line of the plurality of CCDs at any one time is called a "main scanning direction", and the direction of the mechanical movement of the scanner head is called a "sub scanning direction."

As described above, the scanner unit 105 may scan an image line-by-line, and may generate color image data. The color image data is image data in which the color components including red, green, and blue (RGB) components are represented in, for example, 8 bits (0 to 255). A number of bits representing each pixel can be freely set within a capability range of the plurality of CCDs or the plurality of CISs. The number of bits representing each pixel is called "image level" or "color depth."

The facsimile unit 106 may receive facsimile data transmitted from a facsimile sending machine over a public switched telephone network (PSTN). The RAM 103 is also used as buffer memory for temporarily storing the facsimile data. In addition, the facsimile unit 106 may send facsimile data to a facsimile receiving machine over the PSTN.

The I/F 107 is an interface for allowing the MFP 10 to communicate with various external devices. The external devices may comprise, for example, a personal computer (PC), and a drive for reading and writing data in a storage medium such as a memory card. The I/F 107 may comprise USB and IEEE 1394.

The operation unit 108 may be operated by a user to provide the MFP 10 with various instructions. An instruction may comprise, for example, a scan instruction for causing the scanner unit 105 to perform scanning, a print instruction for causing the printer unit 104 to perform printing on a printing medium, and a facsimile instruction for causing the facsimile unit 106 to send facsimile data to a facsimile receiving machine over the PSTN. The instruction to the MFP 10 may be provided from a PC, or the like, through the I/F 107.

The display unit 109 may notify the user of various information, and comprises an LCD, an LED, or the like. The various information provided to the user may comprise, for example, a state of the MFP 10 (scanning, printing, faxing, or idling), and a setting menu of the MFP 10.

The forwarding unit 110 may forward content and other information of a facsimile communication from the facsimile sending machine over the PSTN to a terminal over a packet network, such as an Internet protocol (IP) network.

The NIC 111 may be a network adapter card using a specific physical layer, or and standard data link layer such as Ethernet or Wi-Fi. When used in a WAN networking environment, the MFP 10 typically comprises a modem or other means for establishing communications over the WAN, such as the Internet.

The DMA controller 112 is a controller for transferring data between constituent elements of the MFP 10.

Figure 2:
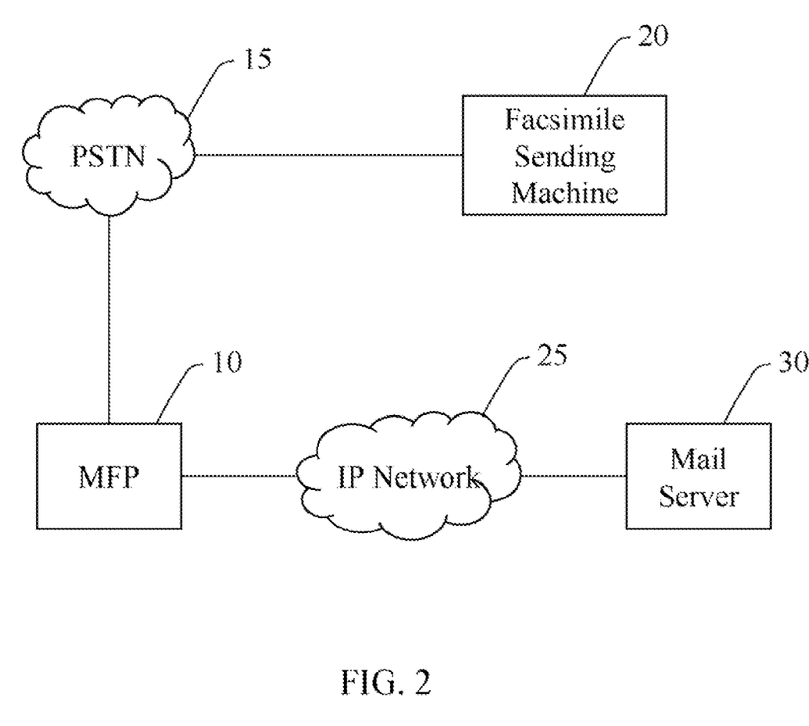
FIG. 2 is a view illustrating one example of a structure of a facsimile transmission system according to one embodiment.

FIG. 2 illustrates one example of a structure of a facsimile transmission system according to one embodiment. The MFP 10 may receive facsimile data transmitted from a facsimile sending machine 20 over a PSTN 15. The MFP 10 may operate in an IP network 25 using a logical connection to a mail server 30 through the NIC 111. The IP network 25 may be a local area network (LAN) or a wide area network (WAN). The mail server 30 may be a simple mail transport protocol (SMTP) server, which can send an E-mail to a destination E-mail address across the IP network 25.

Figure 3:
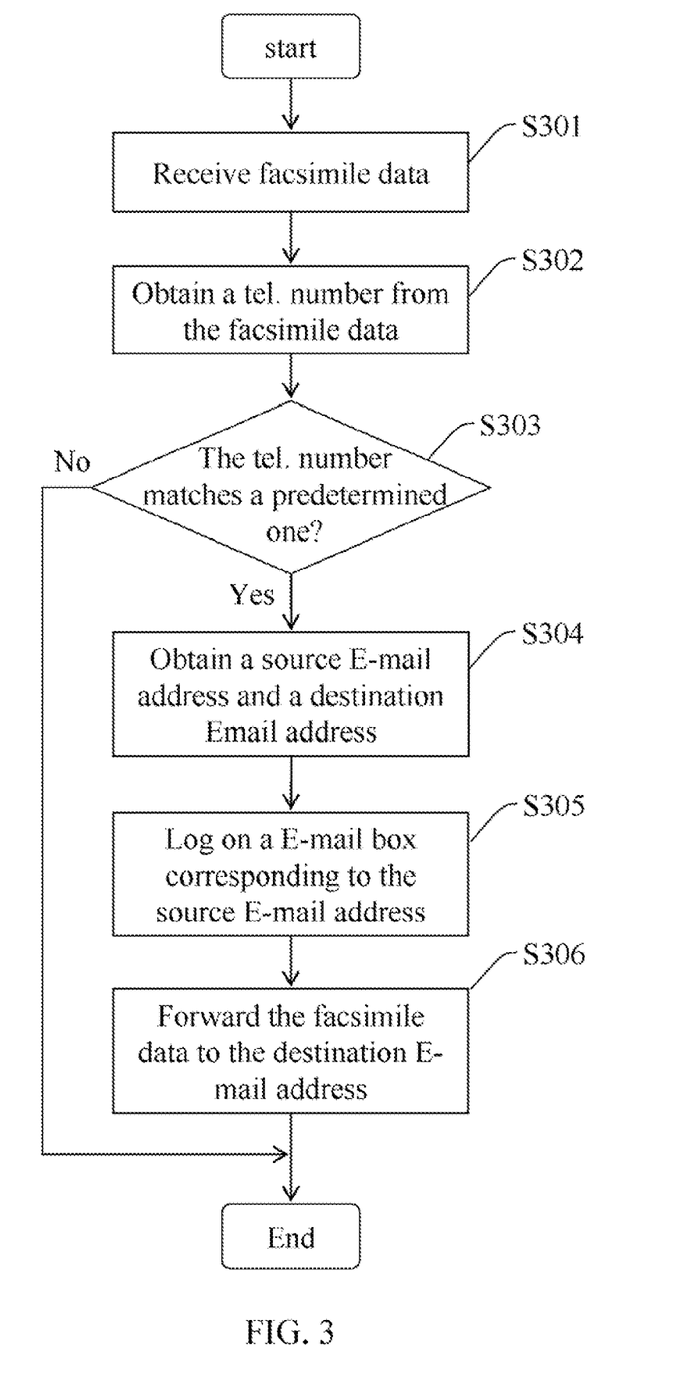
FIG. 3 is a flowchart showing a first embodiment of a method for forwarding facsimile data using the MFP of FIG. 1.

FIG. 3 is a flowchart showing a first embodiment of a method for forwarding facsimile data using the MFP 10 of FIG. 1. The method may comprise the following steps.

In step S301, the facsimile unit 106 receives facsimile data transmitted via the PSTN 15 from the facsimile sending machine 20.

In step S302, the MFP 10 obtains a telephone number of the facsimile sending machine 20 from the received facsimile data.

Figure 4:
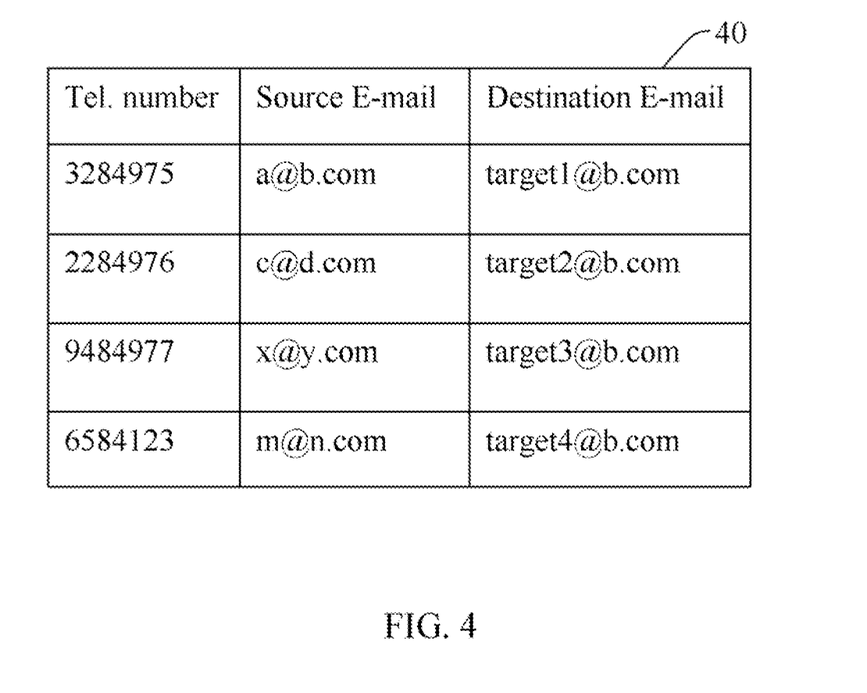
FIG. 4 is an example of a mapping table including predetermined identification information according to the first embodiment.

In step S303, the MFP 10 determines whether the telephone number of the facsimile sending machine 20 matches a pre-stored telephone number stored in a mapping table 40. FIG. 4 shows an example of the mapping table 40. The mapping table 40 comprises a plurality of pre-stored telephone numbers and source E-mail addresses and destination E-mail addresses corresponding to the pre-stored telephone numbers. Each of the source E-mail addresses corresponds to an E-mail box, which may serve as a sender's E-mail box. Each of the destination E-mail addresses may correspond to a recipient's E-mail, which is supposed to receive the facsimile data. The MFP 10 obtains the plurality of pre-stored telephone numbers from the mapping table 40, and compares the telephone number of the facsimile sending machine 20 to each of the plurality of pre-stored telephone numbers. If the telephone number of the facsimile sending machine 20 matches one of the plurality of pre-stored telephone numbers, the flow goes to step S304. If the telephone number of the facsimile sending machine 20 does not match any of the plurality of pre-stored telephone numbers, a facsimile receiving process from the facsimile sending 20 machine is complete.

In step S304, the MFP 10 obtains from the mapping table 40 a source E-mail address and a destination E-mail address corresponding to the telephone number of the facsimile sending machine 20.

In step S305, the forwarding unit 111 connects to the mail server 30 over the IP network 25 and transmits identification data, such as a user ID and a password, to the mail server for authentication to log on an E-mail box corresponding to the source E-mail address.

In step S306, the forwarding unit 111 forwards the facsimile data to the destination E-mail address from the E-mail box.

Figure 5:
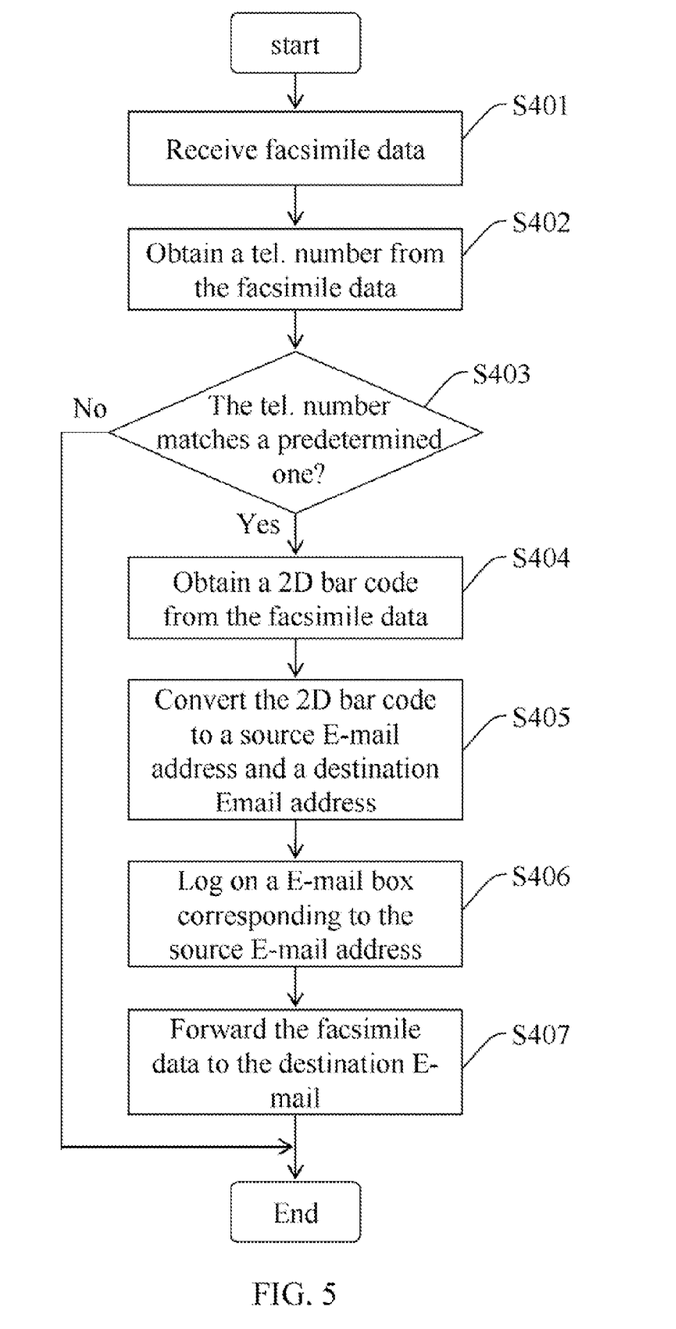
FIG. 5 is a flowchart showing a second embodiment of a method for forwarding facsimile data using the MFP of FIG. 1.

FIG. 5 is a flowchart showing a second embodiment of a method for forwarding facsimile data using the MFP 10 of FIG. 1. The method may comprise the following steps.

In step S401, the facsimile unit 106 receives facsimile data transmitted from the facsimile sending machine 20 over the PSTN 15.

In step S402, the MFP 10 obtains the telephone number of the facsimile sending machine 20 from the received facsimile data.

Figure 6:
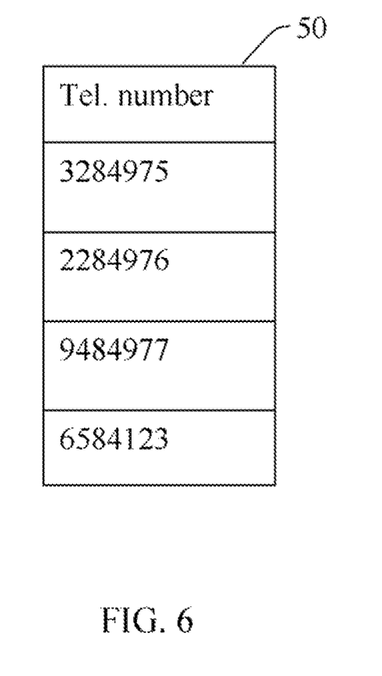
FIG. 6 is an example of a mapping table including predetermined identification information according to the second embodiment.

In step S403, the MFP 10 determines whether the telephone number of the facsimile sending machine 20 matches a pre-stored telephone number in a mapping table 50. FIG. 6 shows an example of the mapping table 50. The mapping table 50 comprises a plurality of pre-stored telephone numbers. The MFP 10 obtains the plurality of pre-stored telephone numbers from the mapping table 50, and compares the telephone number of the facsimile sending machine 20 to each of the plurality of pre-stored telephone numbers. If the telephone number of the facsimile sending machine 20 matches one of the plurality of pre-stored telephone numbers, the flow goes to step S404. If the telephone number of the facsimile sending machine 20 does not match any of the plurality of pre-stored telephone numbers, a facsimile receiving process from the facsimile sending 20 machine is complete.

Figure 7:
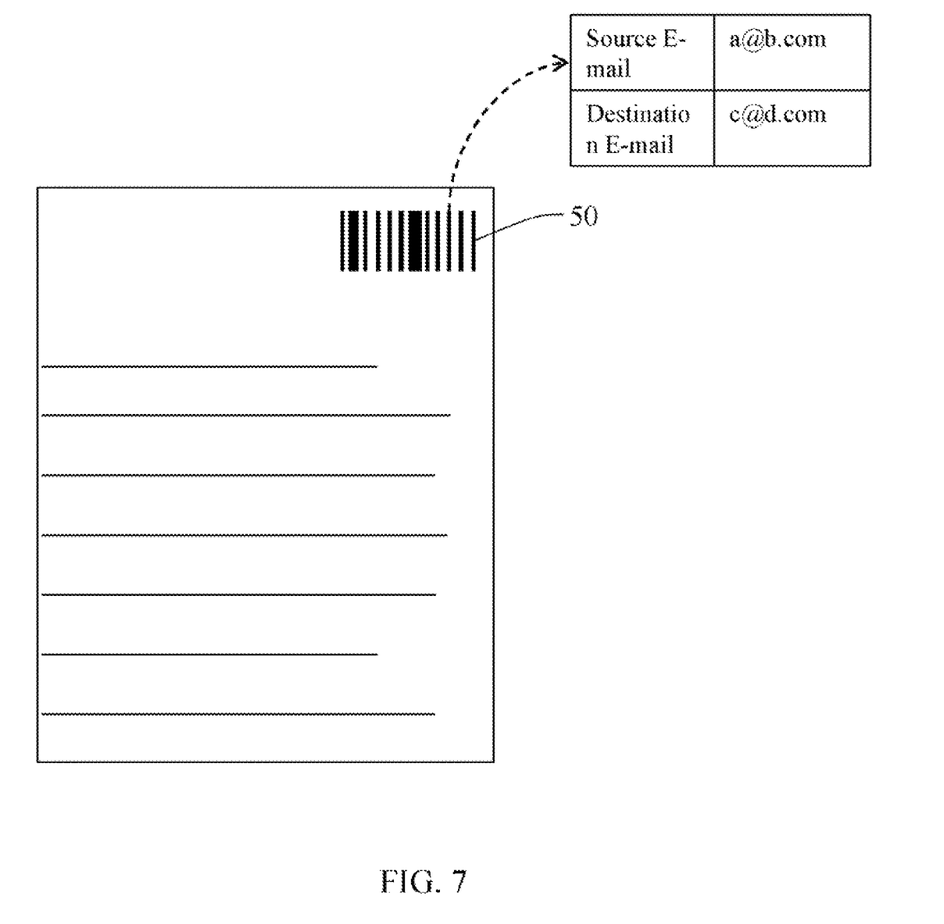
FIG. 7 is an example of a two-dimensional (2D) bar code comprised in facsimile data according to the second embodiment.

In step S404, the MFP 10 obtains a two-dimensional (2D) bar code from the facsimile data. FIG. 7 shows an example of a 2D bar code 50 comprised in the facsimile data according to the second embodiment. The 2D bar code 50 comprises information of a source E-mail address and a destination E-mail address of the telephone number of the facsimile sending machine 20. The 2D bar code may be extracted from the fax data and be recognized in a digital form. So there may not be necessary to print the fax data on a sheet of paper to obtain the bar code.

In step S405, the MFP 10 converts the 2D bar code 50 to a source E-mail address and a destination E-mail address.

In step S406, the forwarding unit 111 connects to the mail server 30 over the IP network 25 and transmits identification data, such as a user ID and a password, to the mail server for authentication to log on an E-mail box corresponding to the source E-mail address.

In step S407, the forwarding unit 111 forwards the facsimile data to the destination E-mail address from the E-mail box.

Figure 8:
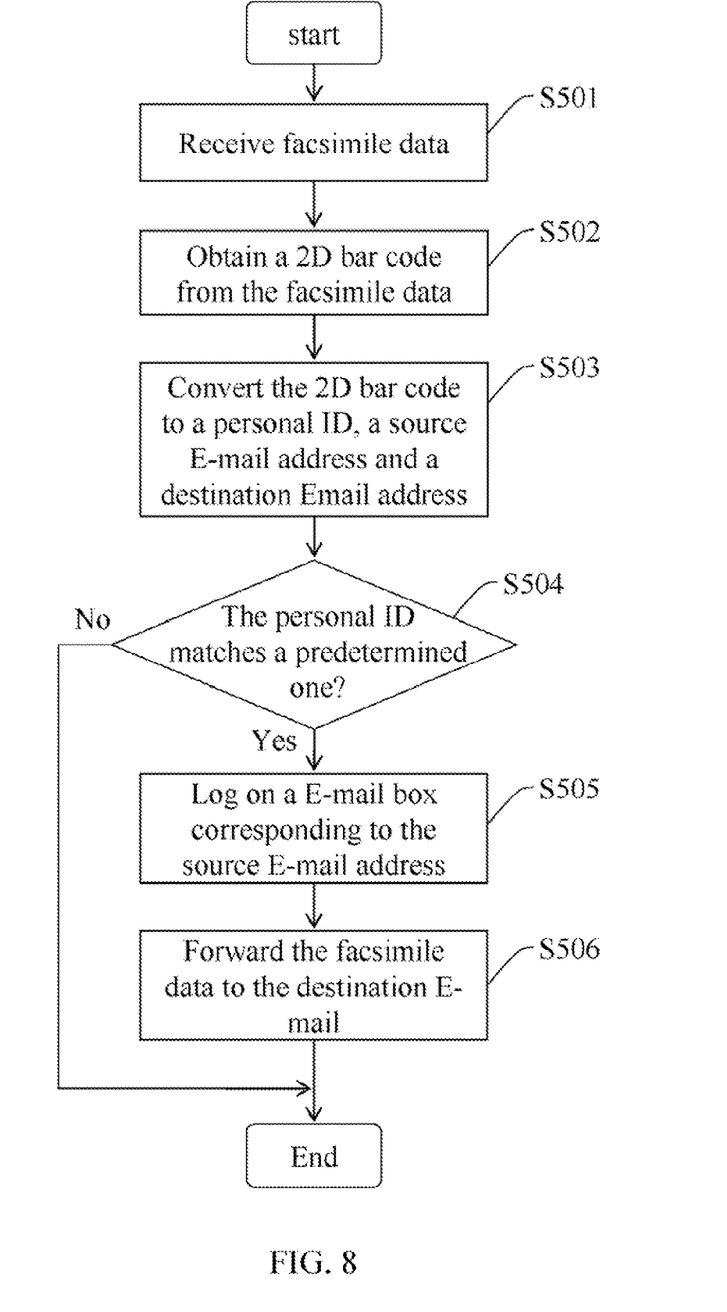
FIG. 8 is a flowchart showing a third embodiment of a method for forwarding facsimile data using the MFP of FIG. 1.

FIG. 8 is a flowchart showing a third embodiment of a method for forwarding facsimile data using the MFP 10 of FIG. 1. The method may comprise the following steps.

In step S501, the facsimile unit 106 receives facsimile data transmitted from the facsimile sending machine 20 over the PSTN 15.

Figure 9:
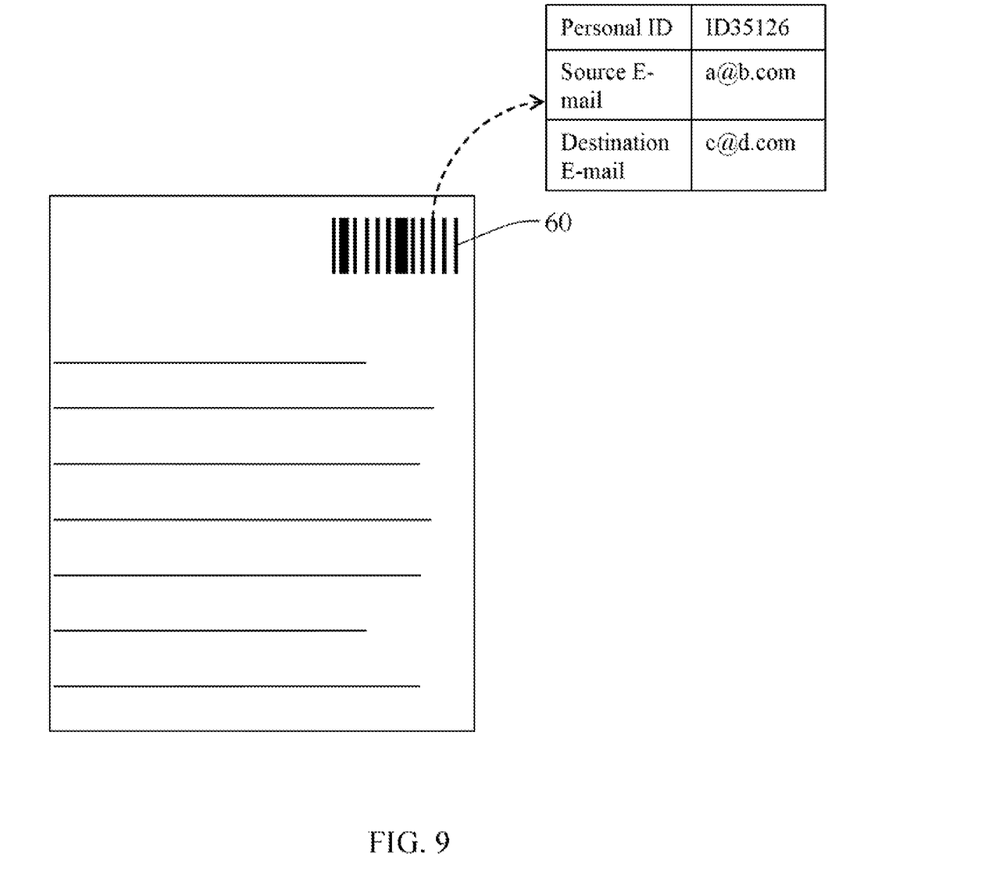
FIG. 9 is an example of a 2D bar code comprised in facsimile data according to the third embodiment.

In step S502, the MFP 10 obtains a two-dimensional (2D) bar code from the facsimile data. FIG. 9 shows an example of a 2D bar code 60 comprised in the facsimile data according to the third embodiment. The 2D bar code 50 comprises information of a personal ID, a source E-mail address, and a destination E-mail address.

In step S503, the MFP 10 converts the 2D bar code 60 to a personal ID, a source E-mail address, and a destination E-mail address.

Figure 10:
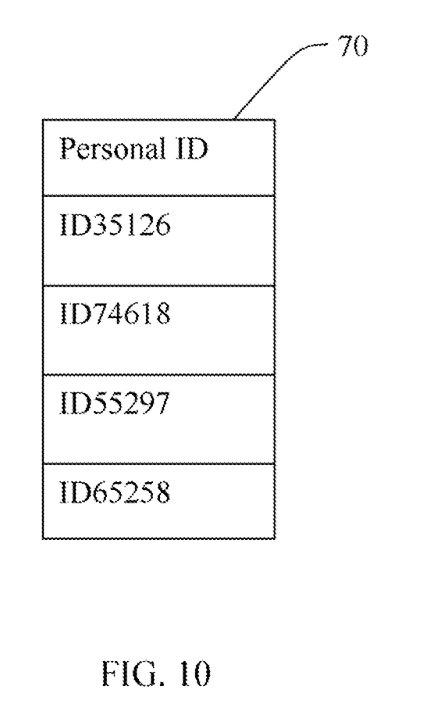
FIG. 10 is an example of a mapping table including predetermined identification information according to the third embodiment.

In step S504, the MFP 10 determines whether the personal ID matches a plurality of pre-stored personal IDs stored in a mapping table 70. FIG. 10 shows an example of a mapping table 70. The mapping table 70 comprises the plurality of pre-stored personal IDs. The MFP 10 obtains the plurality of pre-stored personal IDs from the mapping table 70, and compares the personal ID to each of the plurality of pre-stored personal IDs. If the personal ID matches one of the plurality of pre-stored personal IDs, the flow goes to step S505. If the personal ID of the facsimile sending machine 20 does not match any of the plurality of pre-stored personal IDs, a facsimile receiving process from the facsimile sending 20 machine is complete.

In step S505, the forwarding unit 111 connects to the mail server 30 over the IP network 25 and transmits identification data, such as a user ID and a password, to the mail server for authentication to log on an E-mail box corresponding to the source E-mail address.

In step S506, the forwarding unit 111 forwards the facsimile data to the destination E-mail address from the E-mail box.

Although numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. The description and the claims drawn for or in relation to a method may comprise some indication in reference to certain steps. However, any indication used is only to be viewed for identification purposes and not as a suggestion as to an order for the steps.

What is claimed is:

1. A facsimile forward method, the facsimile forward method comprising:
    storing predetermined identification information and a source E-mail address in a mapping table;
    receiving facsimile data from a facsimile sending machine over a telephone network;
    extracting identification information from the facsimile data;
    obtaining the predetermined identification information and the source E-mail address from the mapping table;
    determining whether the identification information matches the predetermined identification information; and
    when the identification information matches the predetermined identification information, logging on an E-mail box of the source E-mail address over a communication network other than the telephone network, and forwarding the facsimile data to a destination E-mail address from the E-mail box.

2. A facsimile machine, comprising:
    a facsimile receiving unit adapted to receive facsimile data from a facsimile sending machine over a telephone network;
    a processing unit adapted to extract identification information from the facsimile data, to obtain predetermined identification information and a source E-mail address from a mapping table, and determine whether the identification information matches the predetermined identification information; and
    a forwarding unit adapted to log on an E-mail box of the source E-mail address over a communication network other than the telephone network, and to forward the facsimile data to a destination E-mail address from the E-mail box, when the identification information matches the predetermined identification information.

3. A facsimile forward method, the method comprising:
    receiving facsimile data from a facsimile sending machine over a telephone network;
    obtaining a two-dimensional bar code from the facsimile data;
    transforming data of the two-dimensional bar code to a personal identifier, a source E-mail address, and a destination E-mail address;
    determining whether the personal identifier matches predetermined identification information;
    logging on an E-mail box of the source E-mail address over a communication network other than the telephone network, when the personal identifier matches the predetermined identification information; and
    forwarding the facsimile data to the destination E-mail address from the E-mail box over the communication network.

* * * * *